United States Patent [19]
Inagawa

[11] Patent Number: 5,317,870
[45] Date of Patent: Jun. 7, 1994

[54] PRESSURE SOURCE FOR PRESSURE DEVICE

[75] Inventor: Shinichi Inagawa, Wako, Japan

[73] Assignee: Honda Giken Kogyo Kabushiki Kaisha, Tokyo, Japan

[21] Appl. No.: 885,877

[22] Filed: May 20, 1992

[30] Foreign Application Priority Data

May 22, 1991 [JP] Japan ................................ 3-117680

[51] Int. Cl.$^5$ .............................................. F16D 31/02
[52] U.S. Cl. ........................................ 60/418; 60/422; 60/431; 60/459
[58] Field of Search ................. 60/413, 418, 415, 422, 60/435, 431, 459, 441; 91/517, 518

[56] References Cited

U.S. PATENT DOCUMENTS

| 3,911,679 | 10/1975 | Matthews | 60/413 X |
| 4,064,694 | 12/1977 | Baudoin | 60/418 X |
| 4,481,768 | 11/1984 | Goshorn et al. | 60/415 X |
| 4,581,893 | 4/1986 | Lindbom | 60/413 X |
| 4,637,209 | 1/1987 | Clark | 60/413 X |
| 4,796,428 | 1/1989 | Hall | 60/418 X |
| 5,062,498 | 11/1991 | Tobias | 60/418 X |

Primary Examiner—Edward K. Look
Assistant Examiner—Hoang Nguyen
Attorney, Agent, or Firm—Armstrong, Westerman, Hattori, McLeland & Naughton

[57] ABSTRACT

A pressure source for a pressure device has a pump for pumping fluid from a tank, an accumulator connected to the pump and to a pressure device, a device for detecting the pressure in the accumulator, and a control system for controlling the operation of the pump in an ON/OFF manner based on results of detection of the pressure detecting device. The pressure detecting device includes a pressure switch to detect pressure in the accumulator to produce an ON/OFF signal, and a pressure sensor outputting a pressure signal corresponding to pressure in the accumulator. The control system judges whether the pressure sensor is normal or out of order, and when the pressure is normal, controls the operation of the pump with the pressure signal. The pressure signal and the ON/OFF signal are compared with each other, and when these signals do not correspond, the pressure switch is determined to be out of order, and when the pressure sensor is out of order, the pump operation is controlled with the ON/OFF signal. In this way, the pump can be controlled appropriately, irrespective of any trouble or abnormality in the detecting device.

8 Claims, 8 Drawing Sheets

PRESSURE SOURCE FOR PRESSURE DEVICE

BACKGROUND OF THE INVENTION

1. Field of the Invention

This invention relates to a pressure source for a pressure device, comprising a pump for pumping a fluid from a fluid tank, an accumulator connected to the pump and to a pressure device, pressure detecting means for detecting the pressure in the accumulator, and a control system for controlling the operation of the pump in an ON/OFF manner on the basis of results of detection of the pressure detecting means.

2. Description of the Prior Art

There is a conventionally known pressure source of the above-described type for a pressure device, used in a brake device, or the like, for a vehicle and which includes, as the pressure detecting means, a pressure switch for detecting the pressure in the accumulator to produce an ON/OFF signal, and a pressure sensor for outputting a pressure signal corresponding to the pressure in the accumulator to detect whether the pressure switch is normal or out of order.

The above-described prior art pressure source for the pressure device is constructed, as shown in FIG. 7, so that if the pressure in the accumulator is reduced, thereby permitting the pressure switch ① to be turned OFF, the pump is started to increase the pressure in the accumulator, and if the pressure in the accumulator is increased, thereby permitting the pressure switch ① to be turned ON, the pump is stopped. If the pressure sensor detects the pressure in the accumulator being increased to exceed a judging value $F_{PH}$, or being reduced to exceed a judging value $F_{PL}$, it is judged that the pressure switch is out of order.

In the above-described prior art pressure source, each of the judging values $F_{PH}$ and $F_{PL}$ as a criterion for judgement of the trouble of the pressure switch is a fixed value. For this reason, if the operating pressure for the pressure switch is offset or deflected toward a high pressure side due to a variation that may be generated during manufacturing, as shown by ② in FIG. 7, it is mis-judged that the pressure switch has an OFF trouble (a trouble of the pressure switch fixed at its OFF position). In contrast, if the operating pressure for the pressure switch is offset or deflected toward a low pressure side as shown by ③, it is mis-judged that the pressure switch has an ON trouble (a trouble of the pressure switch fixed at its ON position).

If the interval between the judging values $F_{PH}$ and $F_{PL}$ as criteria for judgement of the troubles is set larger, as shown in FIG. 8, in order to avoid the above-described misjudgement, the range of controlling hydraulic pressure becomes wider, and as a result, an abnormal increase or reduction in hydraulic pressure may be caused.

SUMMARY OF THE INVENTION

Accordingly, it is an object of the present invention to provide a pressure source for a pressure device, wherein it can be properly judged whether the pressure detecting means is normal or out of order and, even if the pressure detecting means went out of order, the operation of the pump can be controlled appropriately.

To achieve the above object, according to a first aspect and feature of the present invention, there is provided a pressure source for a pressure device comprising, a pump for pumping a fluid from a fluid tank, an accumulator connected to the pump and a pressure device, pressure detecting means for detecting the pressure in the accumulator, and a control system for controlling the operation of the pump in an ON/OFF manner on the basis of results of detection of the pressure detecting means, wherein the pressure detecting means includes a pressure switch for detecting the pressure in the accumulator to produce an ON/OFF signal, and a pressure sensor for outputting a pressure signal corresponding to the pressure in the accumulator, and wherein the control system judges whether the pressure sensor is normal or out of order. When the control system judges that the pressure sensor is normal, the operation of the pump is controlled on the basis of the pressure signal, and the pressure signal and the ON/OFF signal are compared with each other. When it has been judged that both the signals do not correspond to each other, the pressure switch is judged to be out of order, but when the control system judges that the pressure sensor is out of order, the operation of the pump is controlled on the basis of the ON/OFF signal.

With the first feature of the present invention, it is judged whether the pressure sensor is normal or out of order, and if it has been judged that the pressure sensor is normal, the operation of the pump is controlled on the basis of the pressure signal from the pressure sensor. Therefore, it is possible to accurately control the operation of the pump by the pressure sensor, which has been confirmed to be normal, without direct use of the ON/OFF signal from the pressure switch which is liable to produce an error due to a variation which may be generated during manufacturing or with the lapse of time. In addition, the ON/OFF signal from the pressure switch is compared with the pressure signal, and if both the signals do not correspond to each other, it is judged that the pressure switch is out of order, and if the pressure sensor is out of order, the operation of the pump is controlled on the basis of the ON/OFF signal. Therefore, it is possible to properly effect the diagnosis of the trouble of the pressure switch by use of a normal pressure signal, and moreover, it is possible to continue the operation of the pump by use of the pressure switch, when the pressure sensor is out of order.

In addition, according to a second aspect and feature of the present invention, there is provided a pressure source for a pressure device comprising, a pump for pumping a fluid from a fluid tank, an accumulator connected to the pump and a pressure device, pressure detecting means for detecting the pressure in the accumulator, and a control system for controlling the operation of the pump in an ON/OFF manner on the basis of results of detection of the pressure detecting means, wherein the pressure detecting means includes a pressure switch for detecting the pressure in the accumulator to produce an ON/OFF signal, and a pressure sensor for outputting a pressure signal corresponding to the pressure in the accumulator, and wherein the control system judges whether the pressure sensor is normal or out of order. When the control system judges that the pressure sensor is normal, the pressure signal, at the time when the ON/OFF signal is switched over with an increase in pressure, is offset to a high pressure side to determine a high pressure side reference value, and/or the pressure signal, at the time when the ON/OFF signal is switched over with a reduction in pressure, is offset to a low pressure side to determine a low pressure side reference value. When the pressure signal has reached the high or low pressure side reference value, the operation of the pump is controlled, but when the control system judges that the pressure sensor is out of order, the operation of the pump is controlled on the basis of the ON/OFF signal.

With the second feature of the present invention, it is judged whether the pressure sensor is normal or out of order, and if it has been judged that the pressure sensor is normal, the pressure signal, at the time when the ON/OFF signal from the pressure switch is switched over, determines the high and low pressure side reference values. When the pressure signal has reached the high or low pressure side reference value, the operation of the pump is controlled. Therefore, even if the pressure switch went out of order, the operation of the pump can be continued on the basis of the determined reference values. Moreover, if the pressure sensor is out of order, the operation of the pump can also be continued by use of the pressure switch.

Further, according to a third aspect and feature of the present invention, there is provided a pressure source for a pressure device, comprising a pump for pumping a fluid from a fluid tank, an accumulator connected to the pump and a pressure device, pressure detecting means for detecting the pressure in the accumulator, and a control system for controlling the operation of the pump in an ON/OFF manner on the basis of results of detection of the pressure detecting means, wherein the pressure detecting means includes a pressure switch for detecting the pressure in the accumulator to produce an ON/OFF signal, and a pressure sensor for outputting a pressure signal corresponding to the pressure in the accumulator, and wherein the control system judges, by comparison of the pressure signal with a previously set judging value, whether the pressure sensor is normal or out of order. When the control system judges that the pressure sensor is normal, the operation of the pump is controlled on the basis of the pressure signal, but when the control system judges that the pressure sensor is out of order, the operation of the pump is controlled on the basis of the ON/OFF signal.

With the third feature of the present invention, the pressure signal from the pressure sensor is compared with the preset judging value. Therefore, it is possible to properly judge whether the pressure sensor is normal or out of order. Thus, even when the pressure sensor is out of order, the operation of the pump can be continued on the basis of the ON/OFF signal from the pressure switch.

In addition to the above first feature, a fourth feature of the present invention is that, when it has been judged that the pressure sensor is normal, the control system further offsets, to a high pressure side, the pressure signal at the time when the ON/OFF signal is switched over with an increase in pressure, thereby determining a high pressure side reference value, and offsets, to a low pressure side, the pressure signal at the time when the ON/OFF signal is switched over with a reduction in pressure, thereby determining a low pressure side reference value. When the pressure signal has reached the high or low pressure side reference value, the control system controls the operation of the pump. The judgement of whether the pressure switch is normal or out of order, after determination of the high and low pressure side reference values, is conducted on the basis of the ON/OFF signal at the time when the pressure signal has reached the high or low pressure side reference value. The judgement whether the pressure switch is normal or out of order, before determination of the high and low pressure side reference values, is conducted on the basis of the ON/OFF signal at the time when the pressure signal has reached a high pressure side judging value, larger than the high pressure side reference value, or a low pressure side judging value, smaller than the low pressure side reference value.

With the fourth feature of the present invention, when the pressure sensor is normal, the pressure signal, at the time when the ON/OFF signal from the pressure switch is switched over, determines the high and low pressure side reference values. When the pressure signal has reached the high or low pressure side reference value, the operation of the pump is controlled. Therefore, even if the pressure switch is out of order, the operation of the pump can be continued on the basis of the determined reference values. Moreover, because the judgement of the trouble of the pressure switch, after determination of the high and low pressure side reference values, is conducted on the basis of the ON/OFF signal at the time when the pressure signal has reached the high or low pressure side reference value, the trouble of the pressure switch can be properly judged.

In addition to the above second feature, a fifth feature of the present invention is that, when it has been judges that the pressure sensor is normal, the control system further compares the pressure signal with the ON/OFF signal and judges that the pressure switch is out of order when both said signals do not correspond to each other. When it has been judged, before determination of said high and low pressure side reference values, that said pressure switch is out of order, the control system controls the operation of the pump on the basis of high and low pressure side reference values previously determined in correspondence to the high and low pressure side reference values.

With the fifth feature of the present invention, when the normal pressure signal and the ON/OFF signal do not correspond to each other, it is judged that the pressure switch is out of order. Therefore, it is possible to effect a proper judgement of the trouble of the pressure switch. In addition, when it has been judged, before determining the high and low pressure side reference values, that the pressure switch is out of order, the operation of the pump can be continued by substituting the previously determined high and low pressure side reference values.

In addition to the above second feature, a sixth feature of the present invention is that pressure source for a pressure device mounted on a vehicle requires a pressure energy increased in accordance with an increase in vehicle speed. The amount of offset to the high pressure side is increased in accordance with an increase in vehicle speed and the amount of offset to the low pressure side is increased in accordance with a reduction in vehicle speed.

With the sixth feature of the present invention, in determining the high and low pressure side reference values, the amount of offset to the high pressure side is increased in accordance with an increase in vehicle speed, while the amount of offset to the low pressure side is increased in accordance with a reduction in vehicle speed. Therefore, it is possible to supply an appropriate hydraulic pressure to a pressure device which requires a pressure energy in accordance with vehicle speed.

In addition to the first or fourth feature, if the operation of the pump is controlled on the basis of the ON/-

OFF signal, before determining the high and low pressure side reference values, it is possible to appropriately control the operation of the pump immediately after the pump is started.

In addition to the second, fourth or seventh feature, if the pressure device is mounted on a vehicle, and the high and low pressure side reference values are determined whenever a power unit of the vehicle is started, it is possible to determine appropriate reference values depending upon the current condition of the vehicle.

The above and other objects, features and advantages of the invention will become apparent from a consideration of the following description of the preferred embodiments, taken in conjunction with the accompanying drawings.

BRIEF DESCRIPTION OF THE DRAWINGS

FIGS. 1 to 6 illustrates a preferred embodiment of the present invention wherein:

FIG. 1 is a diagram of the entire hydraulic pressure circuit of a pressure source for a pressure device of the present invention;

FIG. 2 is a diagram illustrating a hydraulic pressure signal input circuit;

FIG. 3 is a graph illustrating output signals from a pressure switch and a pressure sensor;

FIG. 4 is a flow chart illustrating the control in the embodiment;

FIG. 5 is a flow chart illustrating the control in the embodiment;

FIG. 6 is a graph illustrating relationship between vehicle speed and offset amounts $\alpha_1$ and $\alpha_2$;

DESCRIPTION OF THE PREFERRED EMBODIMENTS

The present invention will now be described in connection with the accompanying drawings by way of a preferred embodiment in which the present invention is applied to a pressure source for a brake device of an automobile.

Figure 1:
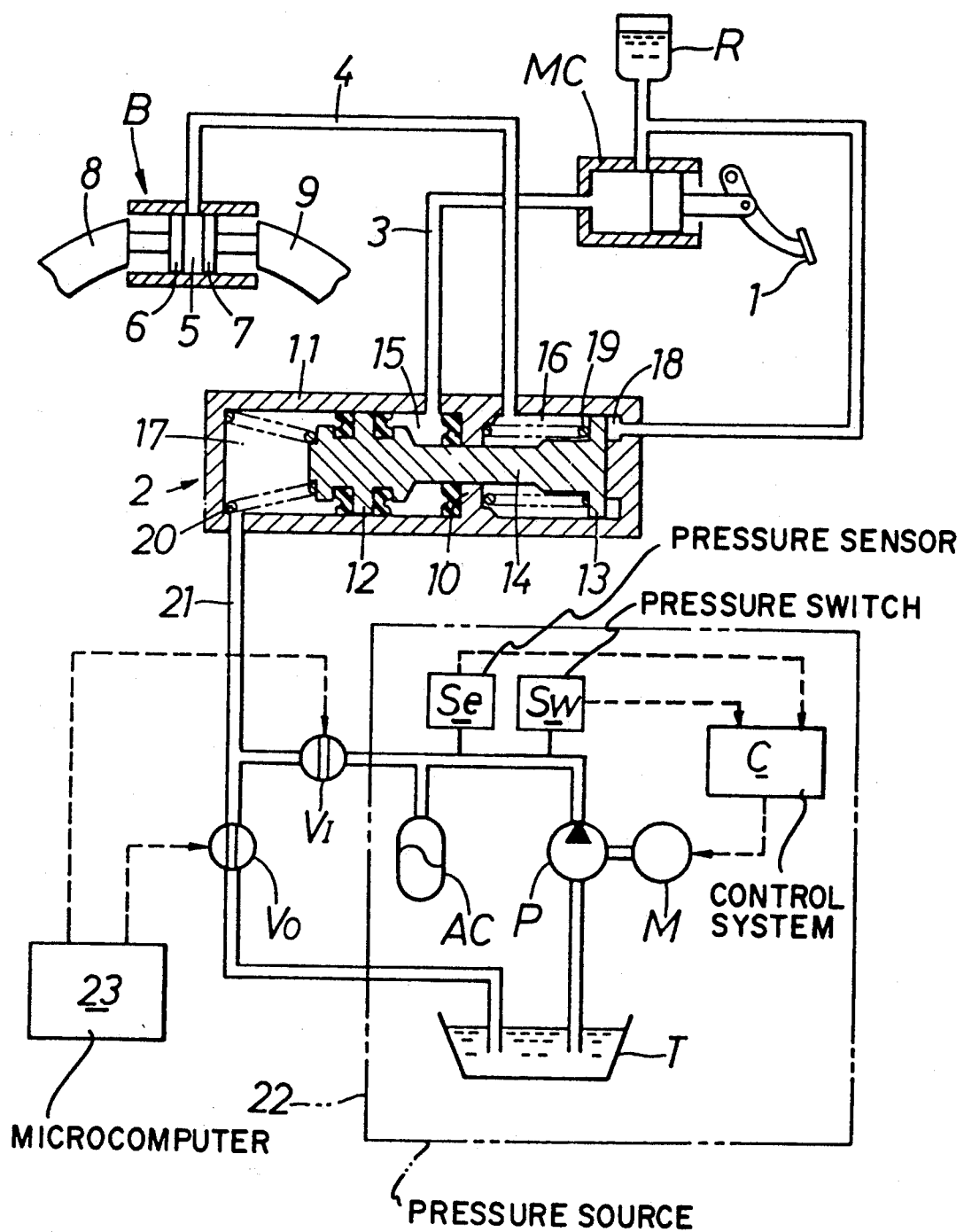

Referring first to FIG. 1, brake pedal 1 is operatively connected to master cylinder MC, so that hydraulic pressure delivered from master cylinder MC is transmitted to wheel brake cylinder B through pressure adjusting device 2.

In wheel brake cylinder B, oil passage 4 is connected to wheel braking cylinder oil chamber 5, so that the supply of a hydraulic pressure through oil passage 4 to braking cylinder oil chamber 5 causes pistons 6 and 7 to be operated away from each other, thereby bringing brake shoes 8 and 9 into contact with a brake drum (not shown) to produce a braking torque.

If the hydraulic braking pressure within braking cylinder oil chamber 5 is too large, the braking torque produced between brake shoes 8 and 9 and the brake drum is too large, and as a result, a wheel on which the brake drum is mounted may be brought into a locked state. Therefore, if the wheel is about to enter its locked state, the hydraulic braking pressure is reduced by adjusting device 2, thereby avoiding wheel locking.

Adjusting device 2 includes cylinder 11, closed at its opposite ends, and partitioned, at its intermediate portion, by partition 10. Rod 14, having pistons 12 and 13 at its opposite ends, passes through partition 10 for sliding movement in an axial direction thereof. Primary hydraulic braking pressure chamber 15 is defined between partition 10 and piston 12 and is connected to master cylinder MC through oil passage 3. Secondary hydraulic braking pressure chamber 16 is defined between partition 10 and piston 13 and is connected to braking oil chamber 5 through oil passage 4. Antilock control hydraulic pressure chamber 17 is formed between one of the end walls of cylinder 11 and piston 12, while releasing oil chamber 18 is defined between the other end wall of cylinder 11 and piston 13. Releasing oil chamber 18 is connected to reservoir R of master cylinder MC. Spring 19 is accommodated in secondary hydraulic braking pressure chamber 16 for biasing piston 13 away from partition 10, while spring 20 is accommodated in antilock control hydraulic pressure chamber 17 for biasing piston 12 toward partition 10

Oil passage 21 is connected to antilock control hydraulic pressure chamber 17 and through normally closed inlet valve $V_I$ and normally opened outlet valve $V_o$ to pressure source 22 and oil tank T in pressure source 22, respectively.

Inlet valve $V_I$ and outlet valve $V_o$ are solenoid valves and are controlled, for opening and closing, by an antilock control processing apparatus comprising microcomputer 23.

In a condition in which inlet valve $V_I$ has been closed and outlet valve $V_o$ has been opened, antilock control hydraulic pressure chamber 17 is opened to oil tank T. Thus, when brake pedal 1 is depressed, permitting hydraulic pressure from master cylinder MC to be supplied into primary hydraulic braking pressure chamber 15, the volume of secondary hydraulic braking pressure chamber 16 is reduced, thereby causing a hydraulic braking pressure, corresponding to the hydraulic pressure from the master cylinder MC, to be supplied to braking oil cylinder chamber 5 in wheel brake B. Therefore, torque during braking is freely increased in accordance with braking operation by a driver. T When inlet valve $V_I$ is opened and outlet valve $V_o$ is closed, antilock control hydraulic pressure is supplied to antilock control hydraulic pressure chamber 17. Therefore, notwithstanding that hydraulic pressure from master cylinder MC is applied to primary hydraulic braking pressure chamber 15, the volume of secondary hydraulic braking pressure chamber 16 is increased, thereby reducing hydraulic pressure in wheel braking cylinder oil chamber 5 in wheel brake B to reduce the braking torque. Accordingly, when the wheel is about to enter its locked state, inlet valve $V_I$ is opened and outlet valve $V_o$ is closed, thereby avoiding locking the wheel.

Pressure source 22 includes pump P for pumping working oil from oil tank T, an accumulator AC connected to pump P and, through valve $V_I$, to adjusting device 2, pressure switch Sw and pressure sensor Se as pressure detecting means for detecting the pressure in accumulator AC, and a control system C for controlling the operation of pump P in an ON/OFF manner on the basis of output signals from pressure switch Sw and pressure sensor Se. DC motor M is connected to pump P. Control system C also controls the operation of motor M in an ON/OFF manner.

Figure 2:
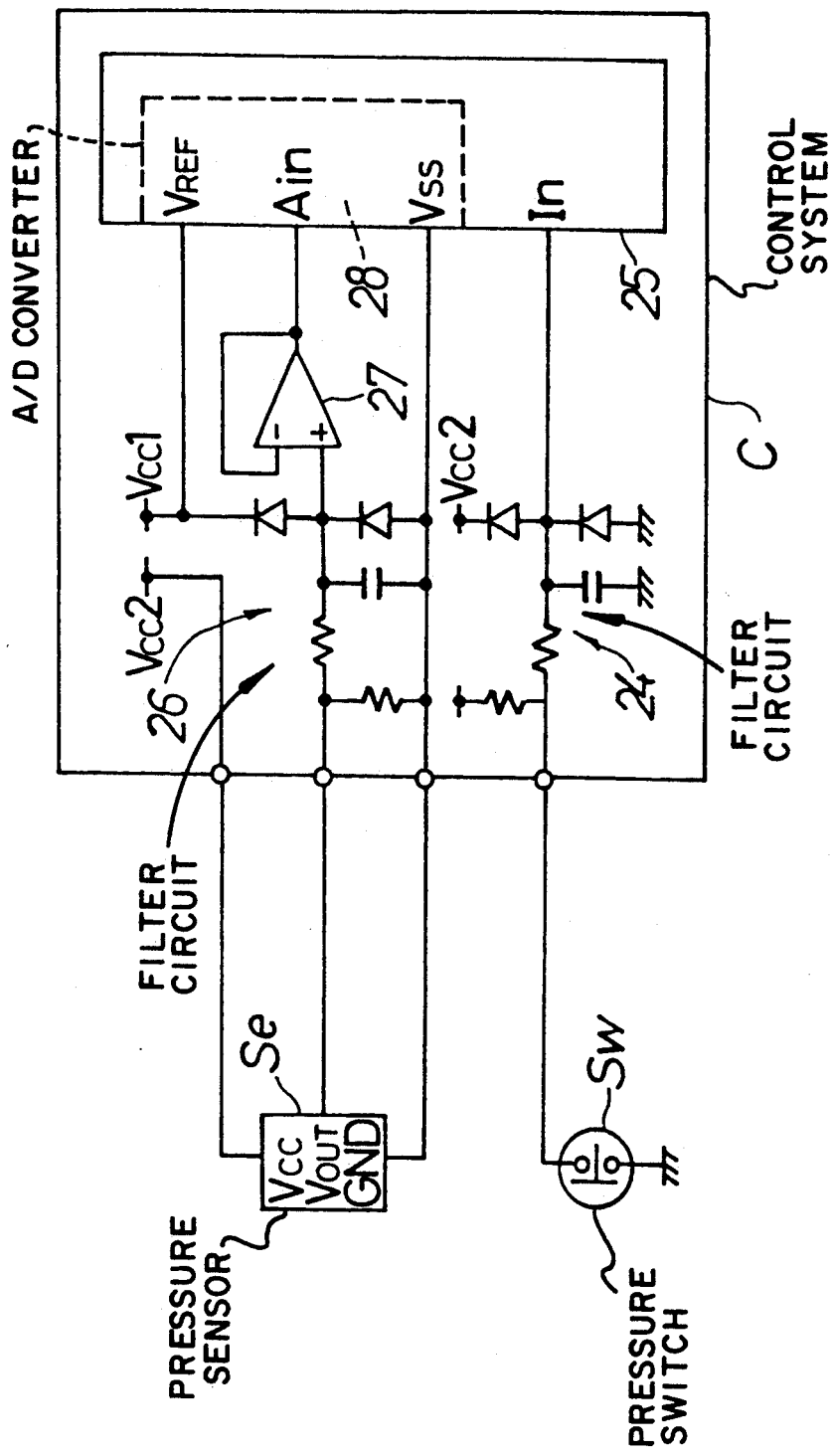

As shown in FIG. 2, the output signal from pressure switch Sw is supplied, through filter circuit 24, to CPU 25 of control system C, and the output signal from pressure sensor Se is supplied, through filter circuit 26 and a buffer 27, to CPU 25. These signals are converted into digital values by AD converter 28.

Figure 3:
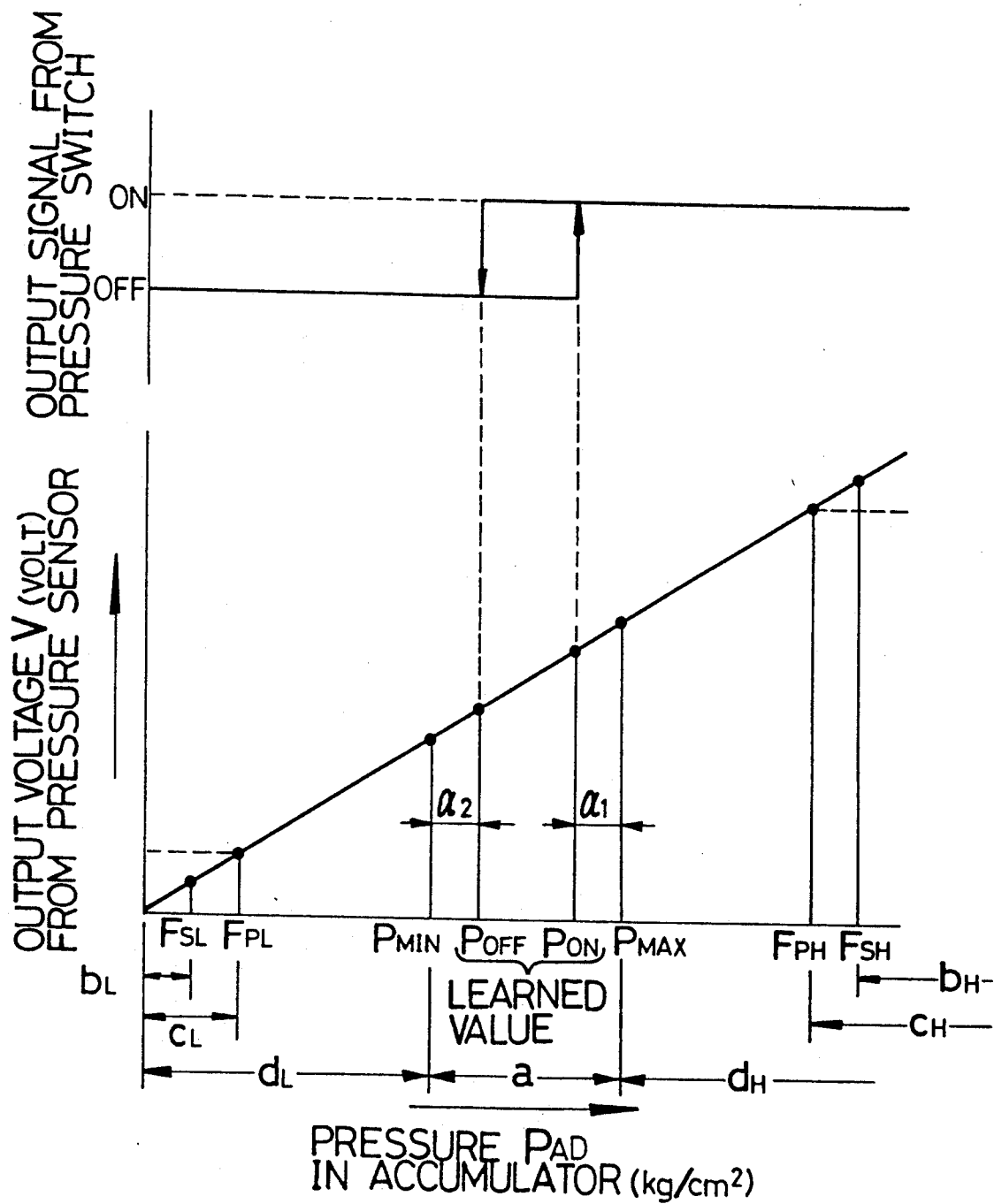

As shown in FIG. 3, as the output voltage V from pressure sensor Se is increased, pressure $P_{AD}$ in accumulator AC, corresponding to an AD converted value of the output voltage V, is also increased.

Figure 4:
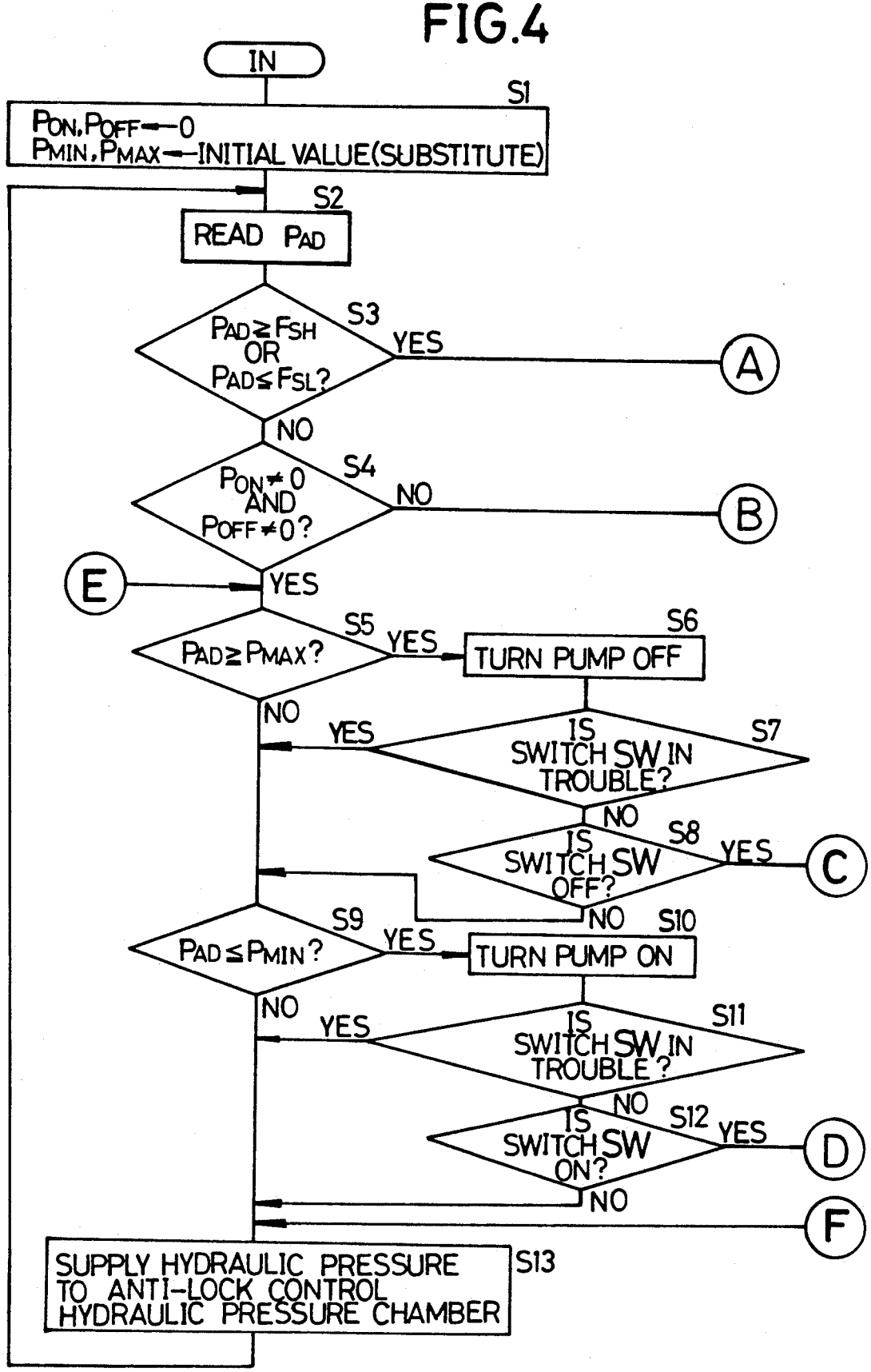
Figure 5:
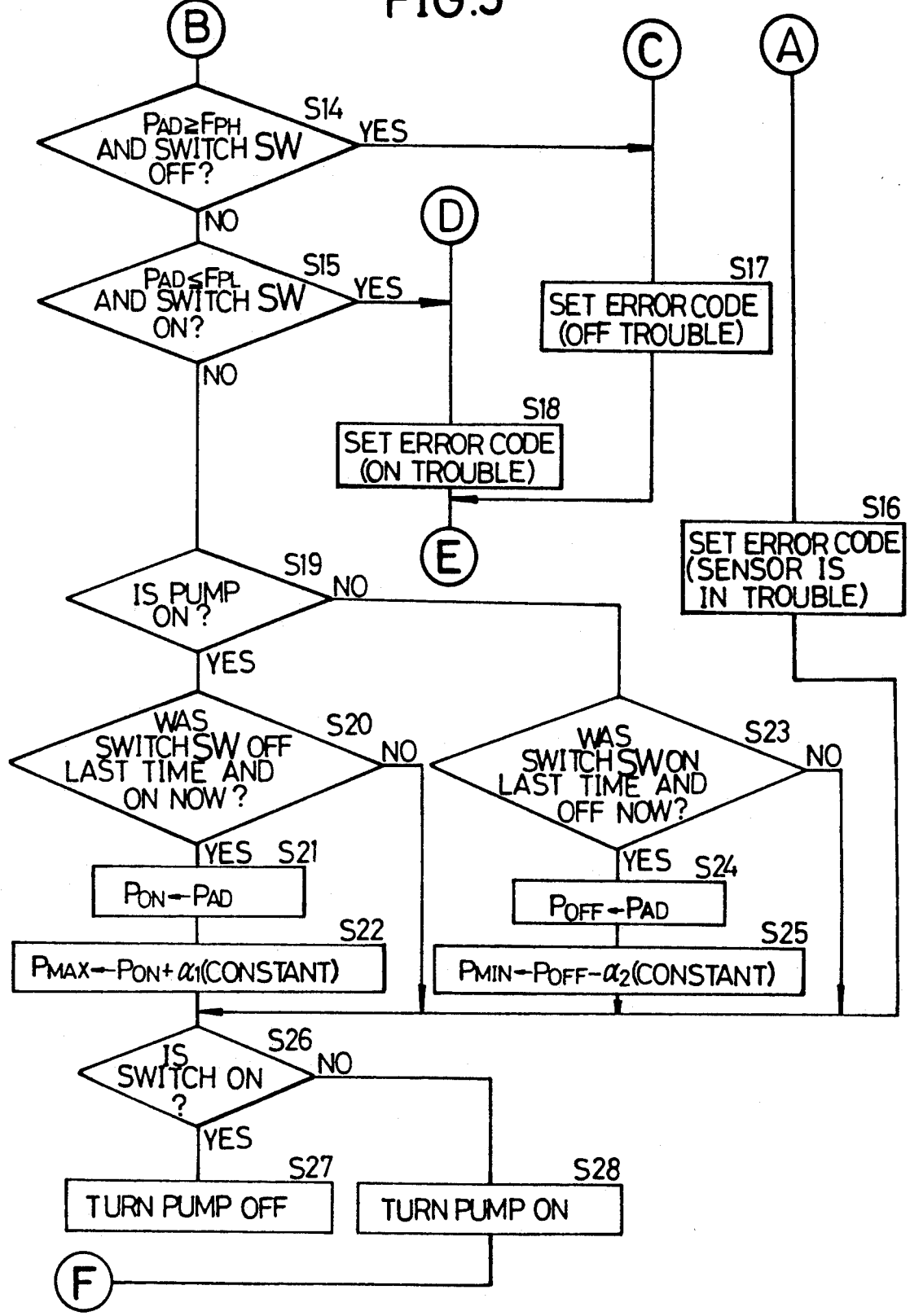

The operation of the pressure source and device of the present invention will be described with reference to FIGS. 4 and 5. The definition of the terms and characters, as shown in FIGS. 4 and 5, and as used hereinafter are, as follows:

ON trouble: trouble of a switch in which the switch is sticked to ON side and cannot be turned to OFF;

OFF trouble: trouble of a switch in which the switch is sticked to OFF side and cannot be turned to ON;

sticking trouble: trouble of a sensor in which the sensor is sticked to one side (either higher pressure side or lower pressure side);

$P_{ON}$: learned value of pressure at the time when pressure switch Sw is switched from OFF to ON;

$P_{OFF}$: learned value of pressure at the time when pressure switch Sw is switched from ON to OFF;

$P_{MAX}$: upper limit value in a range of controlling hydraulic pressure after completion of the determination;

$P_{MIN}$: lower limit value in the range of controlling hydraulic pressure after completion of the determination;

$F_{SH}$: value for judging the sticking trouble of pressure sensor Se at a higher pressure side;

$F_{SL}$: value for judging the sticking trouble of pressure sensor Se at a lower pressure side;

$F_{PH}$: value for judging the OFF trouble of pressure switch Sw before completion of the determination; and $F_{PL}$: value for judging the ON trouble of pressure switch Sw before completion of the determination.

It should be noted that each of the values of $P_{ON}$ and $P_{OFF}$ of pressure switch Sw may not be constant precisely because of a variation or error which may be generated during manufacturing or with the lapse of time.

The operation of the above-described embodiment will be described in connection with flow charts shown in FIGS. 4 and 5.

Every time, when an ignition switch in a vehicle equipped with a braking system having a pressure source according to the present invention, is turned ON, as at a step S1, FIG. 4, the values $P_{ON}$ and $P_{OFF}$, at the time when the pressure switch Sw is turned ON and OFF are set at zero, which is an initial value, and each of the lower limit value $P_{MIN}$ and the upper limit value $P_{MAX}$ is set at a preset initial value (a substitute value). Then, at step S2, pressure $P_{AD}$, corresponding to the AD converted value of the output voltage from pressure sensor Se, is read.

Subsequently, at step S3, the pressure $P_{AD}$ is compared with the value $F_{SH}$ (for judging the sticking trouble of the pressure sensor Se at the higher pressure side) and the value $F_{SL}$ (for judging the sticking trouble of the sensor Se at the lower pressure side). If $P_{AD} \geq F_{SH}$, or $P_{AD} \leq F_{SL}$ (regions indicated by $b_H$ and $b_L$ in FIG. 3), i.e., if the output signal from pressure sensor Se is out of the limit, it is judged that pressure sensor Se is out of order, namely, has trouble, and at step S16, FIG. 5, an error code is set up. When sensor Se is out of order, the operation of pump P is controlled by the output signal from pressure switch Sw (at steps S26 to S28, FIG. 5).

When it is judged, at step S3, FIG. 4, that pressure sensor Se is normal, it is then judged, at step S4, whether or not the $P_{ON}$ and $P_{OFF}$ are zero, i.e., whether or not the determination has been completed. If the determination is not completed, then processing passes to step S14, FIG. 5, where pressure $P_{AD}$ is compared with value $F_{PH}$ (for judging OFF trouble of pressure switch Sw). If pressure switch Sw is OFF, despite $P_{AD} \geq F_{PH}$ (a region indicated by $C_H$ in FIG. 3), it is determined that pressure switch Sw has OFF trouble, and at step S17, the error code is set up. When the pressure switch Sw has no OFF trouble, processing is passed to step S15, where pressure $P_{AD}$ is compared with value $F_{PL}$ (determining ON trouble of pressure switch SW). If the pressure switch Sw is ON, despite $P_{AD} \leq F_{PL}$ (a region indicated by $C_L$ in FIG. 3), then it is determined that pressure switch Sw has ON trouble, and at a step S18, FIG. 5, error code is set up.

When it has been determined, at the steps S14 and S15, that pressure switch Sw is normal, determination is conducted at steps S19 to S25. In other words, when pump P is currently in operation, pressure $P_{AD}$, at the time when the pressure switch Sw has been switched from OFF to ON, is determined as $P_{ON}$ (at steps S19, S20 and S21, FIG. 5). At step S22, a value resulting from addition of predetermined constant $a_1$ to the value $P_{ON}$ is determined as an upper limit value $P_{MAX}$ in the range of controlling hydraulic pressure after completion of the determination. On the other hand, when pump P is currently in shut-down, pressure $P_{AD}$, at the time when the pressure switch Sw has been switched from ON to OFF, is determined as $P_{OFF}$ (at the steps S19, S23 and S24) and, at the subsequent step S25, a value resulting from subtraction of a predetermined constant $a_2$ from learned value $P_{OFF}$ is determined as a lower limit value $P_{MIN}$ in the range of controlled hydraulic pressure after completion of the determination.

Figure 6:
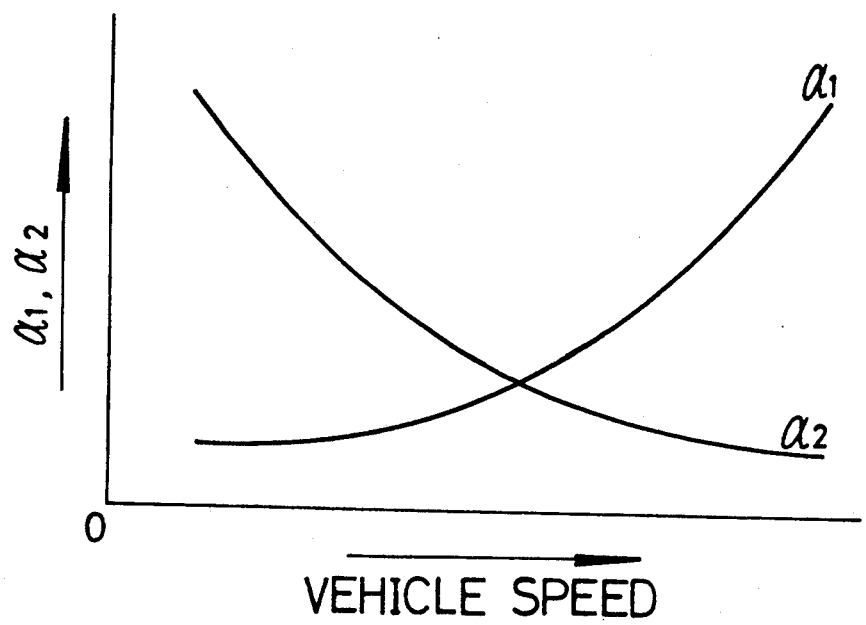
Figure 7:
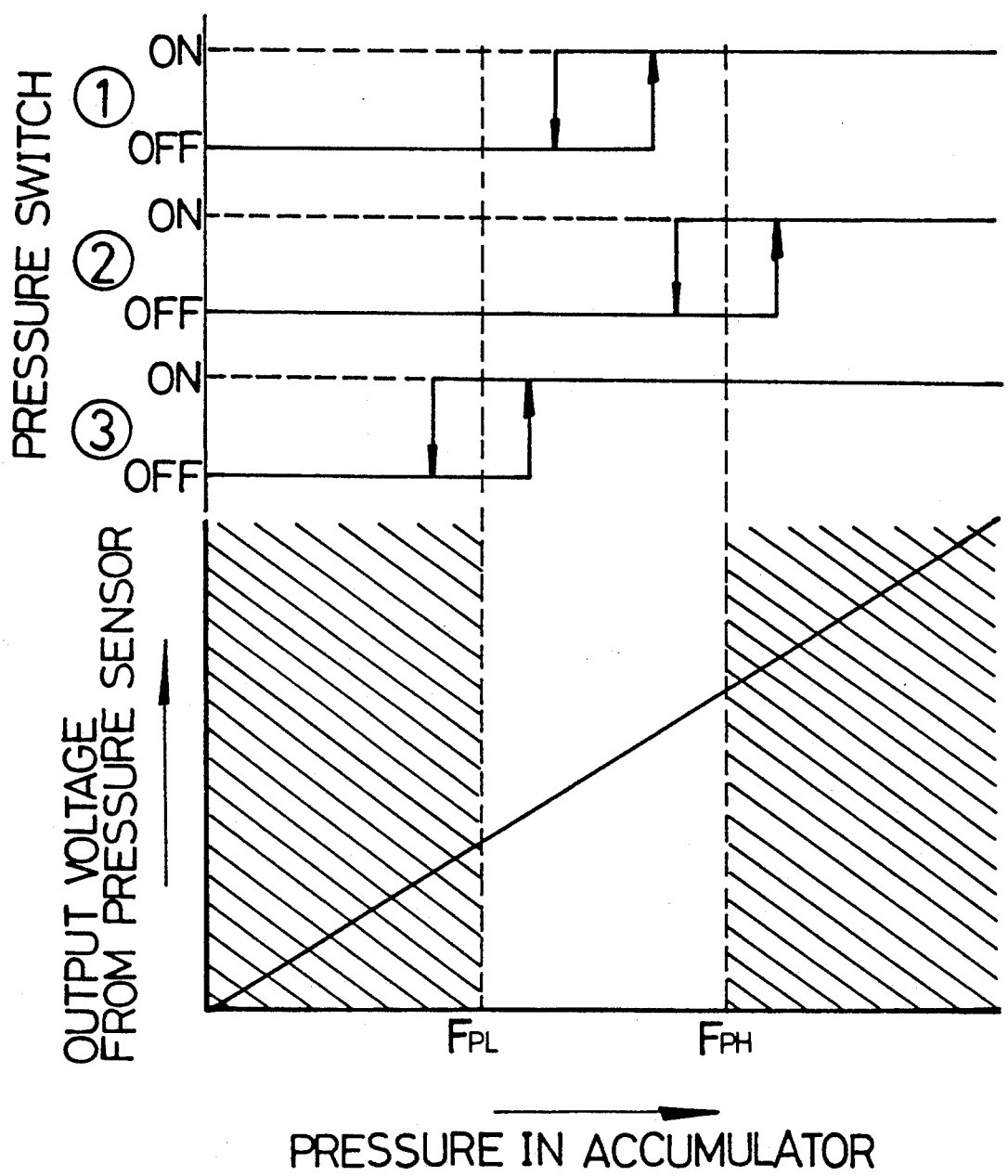
FIGS. 7 and 8 are graphs illustrating the control of a prior art pressure source for a pressure device.
Figure 8:
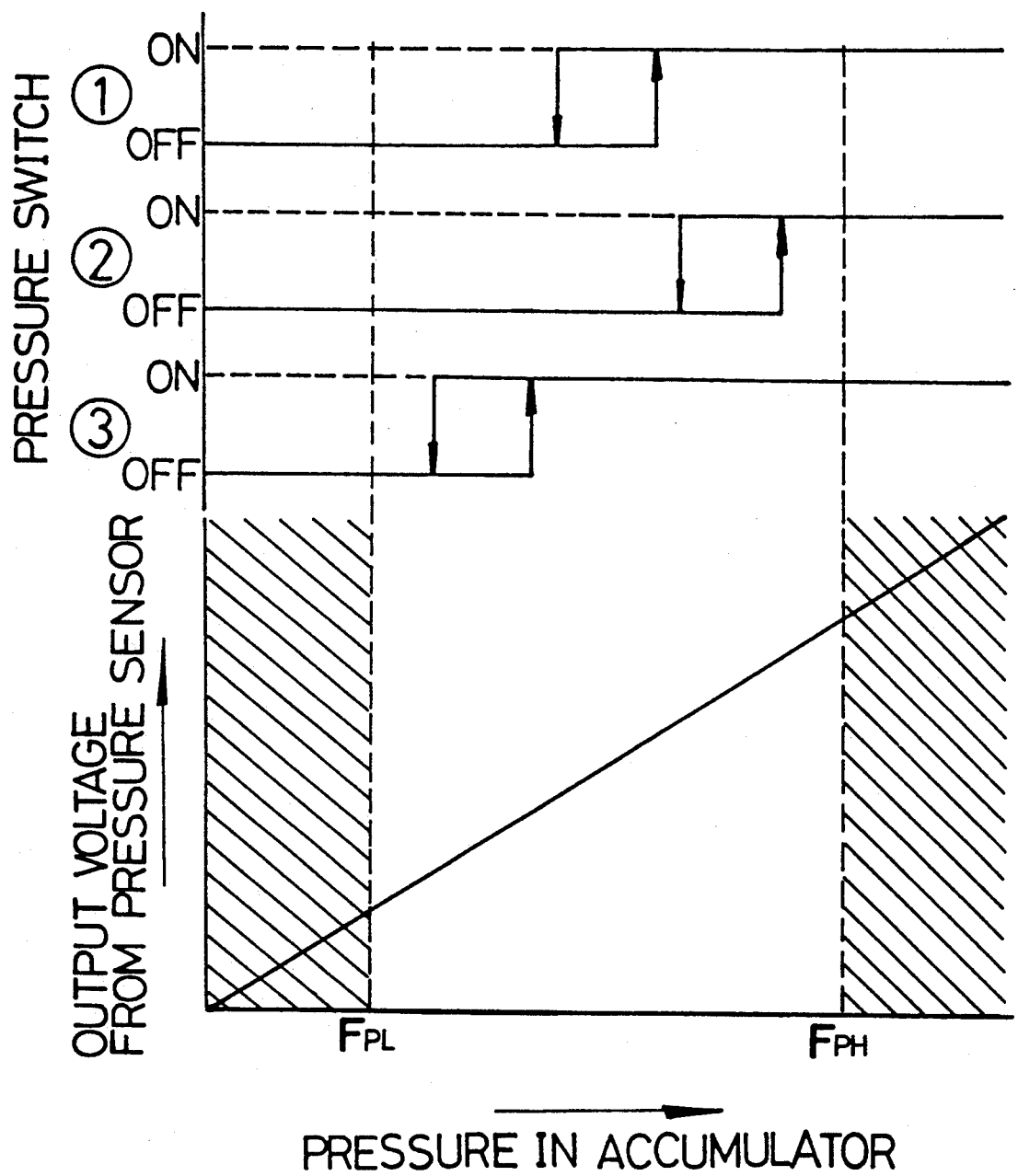

Each of the constants $a_1$ and $a_2$ is a previously set fixed value and can be set as a variable value which is a function of vehicle speed. More specifically, if the constant $a_1$ is increased and the constant $a_2$ is decreased, in accordance with an increase in vehicle speed, as shown in FIG. 6, the upper limit value $P_{MAX}$, in the range of controlling hydraulic pressure, can be increased at a high vehicle speed at which a large hydraulic braking pressure is required, and the lower limit value $P_{MIN}$, in the range of controlling hydraulic pressure, can be decreased at a low vehicle speed at which a small hydraulic braking pressure is only required.

It should be noted that if NO at the steps S20 and S23, FIG. 5, i.e., until the upper and lower limit values $P_{MAX}$ and $P_{MIN}$, in the range of controlling hydraulic pressure, are determined, the operation of the pump is controlled on the basis of the output signal from the pressure switch Sw at the steps S26 to S28.

After completion of determinations in the above-described manner, the operation of pump P is controlled on the basis of the output signal from pressure sensor Se, and judgement of the trouble of pressure switch Sw, after completion of the determination is conducted, at the steps S5 to S12, FIG. 4. More specifically, when pressure $P_{AD}$ is equal to, or more than, limit value $P_{MAX}$ in the range of controlling hydraulic pressure, at step S5, the Operation of pump P is turned OFF at step S6. When pressure $P_{AD}$ is equal to, or less than, lower limit value $P_{MIN}$ in the range of controlling hydraulic pressure, at the step S9, pump P is turned ON, at the step S10, whereby pump P is controlled in an ON-/OFF manner in a region between upper and lower limit values $P_{MAX}$ and $P_{MIN}$ in the controlled hydraulic pressure range (i.e., a region indicated by "a" in FIG. 3). If the pressure switch Sw is OFF, at step S8, notwithstanding that the error code of the OFF trouble of pressure switch Sw is currently not set at step S7, namely, if pressure switch Sw is OFF, in a region indicated by $d_H$ in FIG. 3, then it is judged that pressure switch Sw has OFF trouble, and, at step S17, the error code is set again. Likewise, if pressure switch Sw is ON, at step S12, notwithstanding that the error code of the ON trouble of the pressure switch Sw is currently not set, at step S11, namely, if the pressure switch Sw is ON in a region indicated by $d_L$, in FIG. 3, then it is judged that pressure switch Sw has ON trouble, and at step S18, the error code is set again. The hydraulic pressure controlled in the above-described manner is introduced into antilock control hydraulic pressure chamber 17, at step S13, to contribute to the operation of the antilock control.

It should be noted that the initial values (substitute values) set, at step S1, as the upper limit value $P_{MAX}$, at step S5 and lower limit value $P_{MIN}$, at step S12, are used, until upper and lower limit values $P_{MAX}$ and $P_{MIN}$, in the controlling hydraulic pressure range, are determined at steps S22 and S25.

Although the embodiment of the present invention has been described in detail, it will be understood that the present invention is not limited to this embodiment, and various modifications in design can be made without departing from the scope of the present invention defined in claims.

For example, the present invention is applicable to various pressure sources other than the pressure sources for the brake devices of automobiles.

What is claimed is:

1. A pressure source for a pressure device, comprising:

a pump for pumping a fluid from a fluid tank, an accumulator connected to said pump and a pressure device, pressure detecting means for detecting pressure in said accumulator, and a control system for controlling operation of said pump so that it is turned either ON or OFF in response to results of detection of said pressure detecting means, wherein said pressure detecting means includes a pressure switch for detecting pressure in said accumulator for producing a pressure switch signal which is supplied to said control system, said pressure switch signal having one of an ON state and an OFF state, and a pressure sensor for outputting a pressure signal to said control system, said pressure signal corresponding to pressure in sad accumulator, and wherein said control system receives said pressure switch signal from said pressure switch and said pressure signal from said pressure sensor, and determines, based on at least said pressure signal, whether said pressure sensor is a normal condition or in an out of order condition, such that when said control system determines that said pressure sensor if determined to be in a normal condition, said control system controls operation of said pump in response to said pressure signal, and compares said pressure signal and said pressure switch signal with each other, to determine, when said pressure signal and said pressure switch signal do not correspond to each other, that said pressure switch is out of order, but when said control system determines that said pressure sensor is out of order, the control system controls operation of said pump with said pressure switch signal.

2. A pressure source for a pressure device, comprising:

a pump for pumping a fluid from a fluid tank, an accumulator connected to said pump and a pressure device, pressure detecting means for detecting pressure in said accumulator, and a control system for controlling operation of said pump so that it is turned either ON or OFF in response to results of detection of said pressure detecting means, wherein said pressure detecting means includes a pressure switch for detecting pressure in said accumulator for producing a pressure switch signal which is supplied to said control system, said pressure switch signal having one of an ON state and an OFF state, and a pressure sensor for outputting a pressure signal to said control system, said pressure signal corresponding to pressure in said accumulator, and wherein said control system receives said pressure switch signal from said pressure switch and said pressure signal from said pressure sensor, and determines, based on at least said pressure signal, whether said pressure sensor is in a normal condition or in an out of order condition, such that when said control system determines that said pressure sensor is in a normal condition, a value of the pressure signal, at a time when said pressure switch signal is switched between the On condition and the OFF condition by an increase in pressure, is offset to a high pressure side for use as a high pressure side reference value; when said pressure switch signal is switched between the ON condition and the OFF condition by a reduction in pressure, is offset to a low pressure side for use as a low pressure side reference value; and when said pressure signal reaches a value which is equal to said high or low pressure side reference value, the operation of the pump is controlled by said control system according to said pressure signal which is output by said pressure sensor, and when said control system determines that said pressure sensor is in an out of order condition, operation of said pump is controlled by said control system according to said pressure switch signal which is output by said pressure switch.

3. A pressure source for a pressure device, comprising:

a pump for pumping a fluid from a fluid tank, an accumulator connected to said pump and a pressure device, pressure detecting means for detecting pressure in said accumulator, and a control system for controlling operation of said pump so that it is turned either ON or OFF in response to results of detection of said pressure detecting means, wherein said pressure detecting means includes a pressure switch for detecting pressure in said accumulator for producing a pressure switch which is supplied to said control system, said pressure switch signal having one of an ON state and an OFF state, ad a pressure sensor for outputting a pressure signal to said control system, said pressure signal corresponding to pressure in said accumulator, and wherein said control system receives said pressure switch signal from said pressure switch and said pressure signal form said pressure sensor, for determining, by comparison of said pressure signal with a previously set determining value, whether said pressure sensor is in a normal condition or in an out of order condition, and when said control system determines that said pressure sensor is in a normal condition, the control system controls operation of said pump with said pressure signal, but when said control system determines that said pressure sensor is in an out of order condition, the control system controls operation of said pump with said pressure switch signal.

4. A pressure source for a pressure device according to claim 1, wherein when determination is made by said control system that said pressure sensor is in a normal condition, said control system further sets a high pressure side reference value by offsetting, to a high pressure side, a value of said pressure signal at a time when said pressure switch signal is switched between an ON condition and an OFF condition with an increase in pressure, and a low pressure side reference value by offsetting, to a low pressure side, a value of said pressure signal at a time when said pressure switch signal is switched between an ON condition and an OFF condition with a reduction in pressure, and when said pressure signal has reached one of said high or low pressure side reference values, said control system controls the operation of said pump in response to said pressure signal which is output by said pressure sensor, said determination of whether said pressure switch is in a normal condition or in an out of order condition, after setting of said high and low pressure side reference values, is conducted on the basis of said pressure switch signal when said pressure signal has reached said high or low pressure side reference value, said determination of whether said pressure switch is in a normal condition or in an out of order condition before setting for said high and low pressure side reference values s conducted by said control system on the basis of said pressure switch signal when said pressure signal has reached a high pressure side determination value larger than said high pressure side reference value or a low pressure side determination value smaller than said low pressure side reference value.

5. A pressure source for a pressure device according to claim 2, wherein when it has been determined that said pressure sensor is in a normal condition, said control system further compares said pressure signal with said pressure switch signal, and determines that said pressure switch is in an out of order condition, when both said signals do not correspond to each other; and when it has been determined before setting of said high and low pressure side reference values that said pressure switch is in an out of order condition, said control system controls the operation of said pump with high and low pressure side reference substitute values which are previously determined as values corresponding to said high and low pressure side reference values.

6. A pressure source for a pressure device according to claim 2, wherein said pressure device is adapted to be mounted on a vehicle, and wherein said pressure device requires a pressure which increases in accordance with an increase in vehicle speed, and the amount of offset to said high pressure side is increased by said control system in accordance with an increase in vehicle speed, while the amount of offset to said low pressure side is increased by said control system in accordance with a reduction in vehicle speed.

7. A pressure source for a pressure device according to claim 2, wherein the operation of said pump is controlled by said control system on the basis of said pressure switch signal before setting of said high and low pressure side reference values.

8. A pressure source for a pressure device according to claim 2, wherein said pressure device is adapted to be connected to a power unit of a vehicle, and said high and low pressure side reference values are and are adapted to be determined whenever the power unit of the vehicle is started.

* * * * *